United States Patent
Rutledge et al.

[11] Patent Number: 5,888,399
[45] Date of Patent: Mar. 30, 1999

[54] WATER-REMOVING FUNNEL INSERT AND METHOD OF APPLICATION THEREOF

[76] Inventors: Dwight Dean Rutledge; Linda Marie Rutledge, both of 726 Parkhill Dr., Channelview, Tex. 77530

[21] Appl. No.: 897,305

[22] Filed: Jul. 21, 1997

[51] Int. Cl.$^6$ ................................................ B01D 11/02
[52] U.S. Cl. .................. 210/634; 210/799; 210/477; 210/482; 210/502.1; 210/DIG. 5
[58] Field of Search .................... 210/634, 670, 210/679, 689, 799, 477, 482, 502.1, DIG. 5

[56] References Cited

U.S. PATENT DOCUMENTS

| | | | |
|---|---|---|---|
| 2,266,350 | 12/1941 | Womack | 210/170 |
| 2,556,722 | 6/1951 | Hersberger et al. | 210/204 |
| 3,016,345 | 1/1962 | Price . | |
| 3,142,612 | 7/1964 | Reiman . | |
| 3,669,275 | 6/1972 | Downs . | |
| 3,951,812 | 4/1976 | Hsu | 210/282 |
| 4,197,204 | 4/1980 | Mathes . | |
| 4,356,090 | 10/1982 | Tran | 210/350 |
| 4,371,441 | 2/1983 | Mathes et al. | 210/649 |
| 4,416,782 | 11/1983 | Kerres | 210/634 |
| 4,430,222 | 2/1984 | Walker | 210/477 |
| 4,859,348 | 8/1989 | Jusaitis et al. | 210/799 |
| 5,108,618 | 4/1992 | Hirasawa | 210/689 |
| 5,271,842 | 12/1993 | Degen et al. | 210/649 |
| 5,513,918 | 5/1996 | Wan | 210/502.1 |

*Primary Examiner*—David A. Reifsnyder
*Attorney, Agent, or Firm*—Maryam Bani-Jamali

[57] ABSTRACT

This invention provides a "one-size-fits-all" water-removing funnel insert having a filter and a supporting body, comprising a porous surface, that upholds the filter. When inserted into a base funnel, the water-removing funnel insert moves automatically to a position that provides maximal stability for the water-removing funnel insert. Hydrocarbon emulsions are poured into the base funnel and dehydrated by the water-removing funnel insert upon passing through the filter placed on the supporting body. The supporting body may be attached to a support tube, to an upwardly-extending bar or to both the support tube and the upwardly-extending bar. Another option in designing the supporting body is to use a support tube that is an extension of the upwardly-extending bar. For the dehydrated hydrocarbon stream to flow through the upwardly-extending bar into the support tube, openings are needed in a section of the upwardly-extending bar existing below the porous surface of the supporting body. The upwardly-extending bar may be hollow, in which case the upwardly-extending bar functions also as a vent to enhance fluid flow. A hook may be used to increase stability of the supporting body and may be, preferably removably, attached to the upwardly-extending bar. The supporting body may also have a tubular side wall.

18 Claims, 6 Drawing Sheets

WATER-REMOVING FUNNEL INSERT AND METHOD OF APPLICATION THEREOF

BACKGROUND OF THE INVENTION

1. Field of the Invention

This invention relates to a water-removing funnel insert and the method of application of the finnel insert.

2. Description of the Prior Art

Numerous commonly-used devices, such as camp stoves, lanterns, model airplanes, chain saws, welding machines, lawnmowers, edgers, weedeaters, golf carts, lawn tractors, outboard boat motors, personal water craft jet skis and generators, utilize hydrocarbon fuels for operation. In many cases, hydrocarbon emulsions are used for such devices without being filtered. Inspection of fuel filters of engines of the devices indicates that fuel systems become contaminated with emulsified water. Consumers transfer unfiltered hydrocarbon emulsions from hydrocarbon containers to such devices without realizing the negative effects created by using unfiltered hydrocarbon emulsions. Unfiltered hydrocarbon emulsions that are stored in such hydrocarbon containers can contain sufficient amount of water and other contaminants to cause depletion of additive packages, damages to carburetors and fuel injectors, an enhancement of bacterial growth and corrosion, to name a few. In addition, problems that are caused by the presence of water in hydrocarbon emulsions are generally not covered by warranties on such devices.

Unfortunately, the presence of emulsified water in fuels is not easily detectable. Neither using samples from the bottom of a storage tank nor applying water-finding pastes provide accurate results in detecting the presence of emulsified water in fuels. Recently, several fuel samples from a major fuel terminal were tested, using the Karl Fischer method and the ASTM (D1533) procedures, to measure the total water content of the fuel. The test results indicated that the water content of the fuel was 0.1% (that is 1000 ppm or approximately ten gallons of water per 10,000 gallons of fuel). Free water is usually present at the bottom of most fuel storage tanks. Also, any empty space above the fuel level in storage tanks contains water vapor, such that water vapor condenses on the inner surface of the walls of the storage tank that surround the empty space. Therefore, owners of fuel storage tanks ascertain that the pick-up point for the pumps attached to the fuel storage tanks is usually about 4 to 6 inches above the tank bottom. Some fuel storage tanks are actually installed at a slight tilt, allowing the pick-up tube to be on a higher end of the tank. However, when the fuel is being delivered, water is mixed with the fuel due to the turbulence caused during unloading of the fuel.

A wide variety of devices and methods have been developed in the past few decades for separating hydrocarbons from aqueous or solvent dispersions. For example, flow-through oil/water separation filters consisting of synthetic foam material that can be periodically compressed to discharge the accumulated oil from the filter body have been marketed. Another example is provided in U.S. Pat. No. 4,416,782, issued on Nov. 22, 1983, wherein Kerres patents a device for separating oil from aqueous or solvent dispersions. Kerres presents extremely fine-fibered, flat-shaped, oleophilic textile articles that withhold oil droplets of oil-in-water dispersions. The oil droplets combine to form larger oil drops which, upon reaching a certain diameter, are released from the textile fiber material and rise to the surface of the liquid where they form an oil layer which can be removed easily by using known techniques.

Many other similar inventions have been developed, some of which still exist in the market. Most of previous and existing patents and innovations have been oriented towards using differences in densities between fuels and water to separate fuels from aqueous or solvent dispersions. A lower amount of emphasis has been placed on developing devices and methods for separating water from hydrocarbon emulsions. Free water appears as drops of water within a hydrocarbon fluid and usually drops to the bottom of the container. However, emulsified water causes the hydrocarbon fluid to appear cloudy and is often referred to as "cloud point". Despite its higher density, emulsified water does not or does not within a satisfactory time period separate from a hydrocarbon emulsion. Relatively large and complicated emulsifiers are generally used at the present to separate emulsified water from hydrocarbon emulsions. Such complicated emulsifiers are not applicable to separating emulsified water from hydrocarbon emulsions used for personal and household devices. If depletion of additive packages, damages to carburetors and fuel injectors and enhancement of bacterial growth and corrosion caused by use of unfiltered hydrocarbon emulsions are to be prevented, emulsified water has to be removed. This invention strives towards developing a simple device that can be used by any individual for separating water from a hydrocarbon emulsion. This device is oriented towards application on a small-scale, light-commercial, non-industrial basis and, particularly, towards separating emulsified water from hydrocarbon emulsions that are used for personal, sport and household fuel-operated equipment.

SUMMARY OF THE INVENTION

A primary object of the invention is to devise a water-removing funnel insert that may be repeatedly used for effectively separating water from a hydrocarbon emulsion.

Another object of this invention is to devise a water-removing funnel insert that is relatively inexpensive and is not difficult to manufacture.

An additional object of this invention is to devise a water-removing funnel insert that does not significantly obstruct any expected flow-through openness of a regular existing funnel.

A final object of this invention is to provide a water-removing funnel insert that is easy to transport, handle and use and that does not require any particular skills for its application.

Additional objects and advantages of the invention will be set forth in part in a detailed description which follows, and in part will be obvious from the description, or may be learned by practice of the invention.

The present invention provides a water-removing funnel insert having a filter and a supporting body, comprising a porous surface, that upholds the filter. The supporting body may also have a base that supports the porous surface. A major advantage of the water-removing funnel insert is its "one-size-fits-all" feature. Each water-removing funnel insert is applicable to any base funnel which has a top opening that is large enough to allow insertion of the water-removing funnel insert into the base funnel and which has a bottom opening that is small enough to prevent exit of the water-removing funnel insert from the bottom opening of the base funnel. When released in the base finnel, the waterremoving funnel insert moves automatically to and rests at a position that provides maximal stability for the water-removing funnel insert. Hydrocarbon emulsions are poured into the base funnel and dehydrated by the waterremoving funnel insert upon passing through the filter placed on the supporting body. The supporting body may be attached to a support tube, used for stabilization of the porous surface, or to an upwardly-extending bar or to both. When both the support tube and the upwardly-extending bar are individually used, the upwardly-extending bar either directly opens into the support tube or ends at the supporting body. Another option in designing the supporting body is to use a support tube that is an extension of the upwardly-extending bar. For the dehydrated hydrocarbon stream to flow through the upwardly-extending bar into the support tube, openings are needed in a section of the upwardly-extending bar existing below the porous surface of the supporting body. The upwardly-extending bar may be hollow, in which case the upwardly-extending bar functions also as a vent to enhance fluid flow. If the upwardly-extending bar is hollow and is an extension of the support tube, the support tube must be hollow as well in order to form a vent for enhancing fluid flow. A hook may be used to increase stability of the supporting body and may be, preferably removably, attached to the upwardly-extending bar. The supporting body may also have a tubular side wall.

It is to be understood that the descriptions of this invention are exemplary and explanatory, but are not restrictive, of the invention. Other objects and advantages of this invention will become apparent from the following specification and from any accompanying charts, tables, examples and drawings.

BRIEF DESCRIPTION OF CHARTS, TABLES, EXAMPLES AMD DRAWINGS

Any accompanying charts, tables, examples and drawings which are incorporated in and constitute a part of this specification, illustrate examples of preferred embodiments of the invention and, along with the description, serve to explain the principles of the invention.

DETAILED DESCRIPTION OF THE PREFERRED EMBODIMENT

Figure 1:
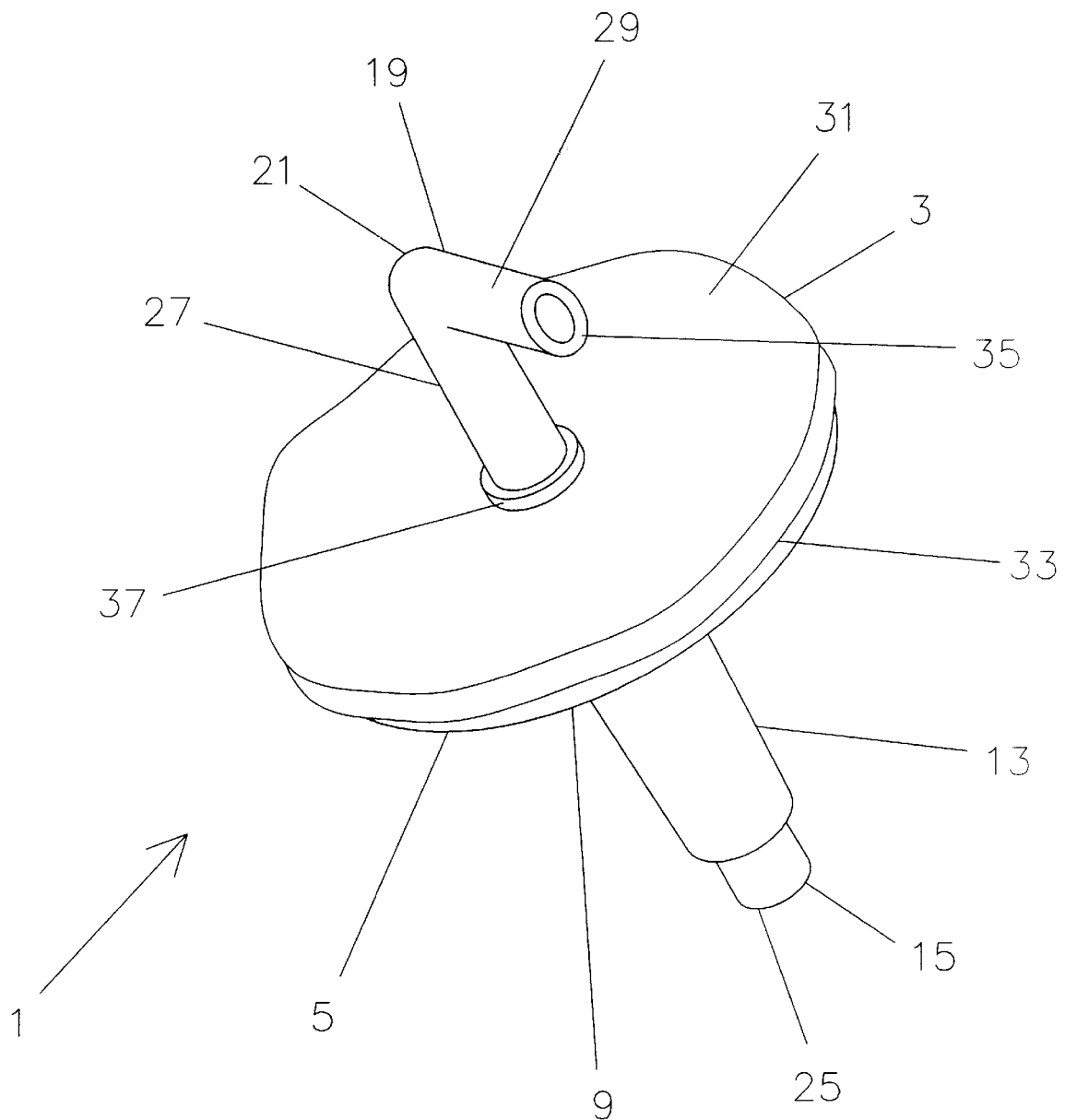
FIG. 1 shows an isometric view of a preferred embodiment of a water-removing funnel insert having a filter.

Preferred embodiments of the present invention are illustrated in any charts, tables, examples and drawings that are included.

The present invention provides a device for separating and removing water and numerous contamants from a hydrocarbon emulsion. The invention, which is referred to hereafter as a "water-removing funnel insert 1", serves to pre-filter hydrocarbon emulsions applied to many commonly-used equipment and appliances. The water-removing finnel insert 1 can be used for devices ranging from sport equipment (e.g. jet skis) to household necessities (e.g. lawnmowers). It is important to note that the waterremoving funnel insert 1 has a structure that enables the application of each waterremoving funnel insert 1 to presently-used funnels 2 of different sizes (i.e. the invention is a "one-size-fits-all"), as long as the funnel 2 has a top opening 6 that is large enough to allow insertion of the water-removing funnel insert 1 into the funnel 2 and has a bottom opening 8 that is small enough to prevent exit of the water-removing funnel insert 1 from the bottom opening 8 of the funnel 2. As a result, each water-removing funnel insert 1, in addition to being usable for various equipment, is applicable to various-sized funnels 2 for adding fuel to such equipment. Simply upon being inserted into a base funnel 2 of applicable dimensions, the water-removing funnel insert 1 automatically reaches and rests in the base funnel 2 at a position that provides maximal stability for the water-removing funnel insert 1. (Please note that the base funnel 2 and its components are not shown in the figures.)

Figure 3:
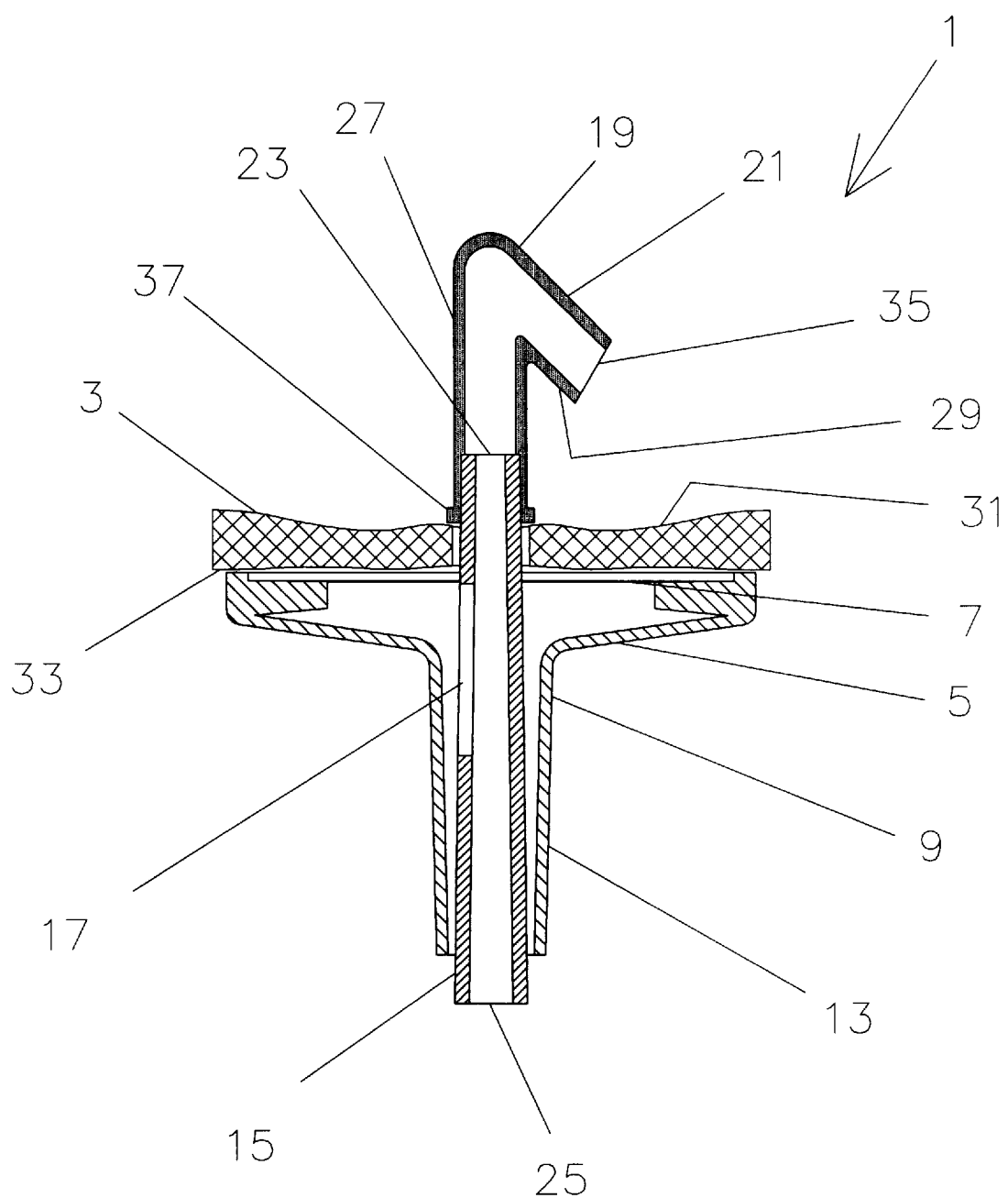
FIG. 3 shows a cross-sectional view of the water-removing funnel insert of FIG. 1.
Figure 6:
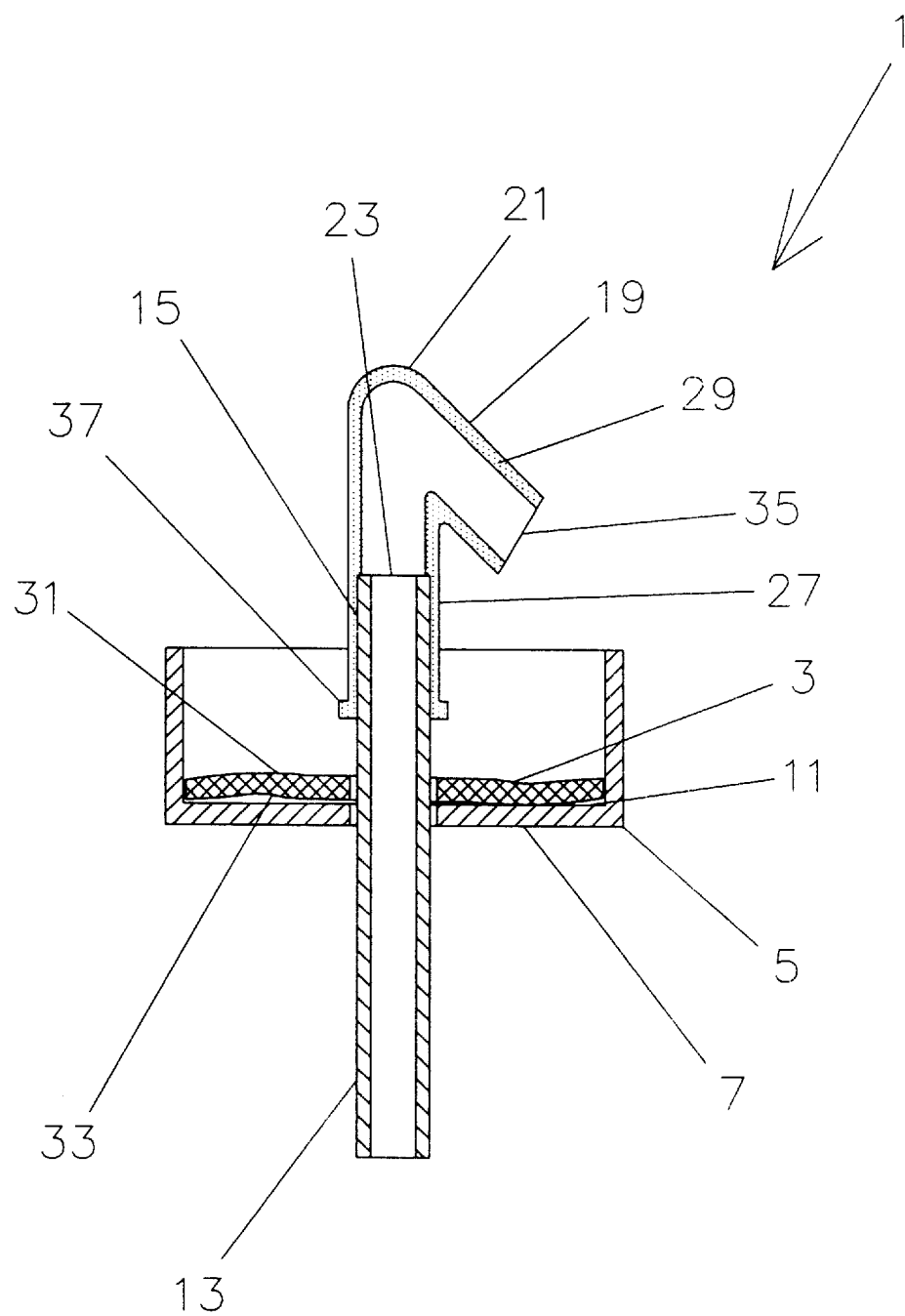
FIG. 6 shows a cross-sectional view of the water-removing funnel insert of FIG. 4.

The water-removing funnel insert 1 comprises a filter 3 and a supporting body 5 that upholds the filter 3. The filter 3 that is used in the present invention is a preventive maintenance means for water removal. The supporting body 5 comprises a porous surface 7 that is completely covered by the filter 3 in order to prevent any unfiltered hydrocarbon emulsion from exiting the water-removing funnel insert 1 without being dehydrated. To remain in position within the flow passage even during flow of the hydrocarbon emulsion in the base funnel 2, the filter 3 is placed securely upon and rests stably on the porous surface 7 (as shown in FIG. 3 and FIG. 6). Support is provided under the filter 3 against collapse of the filter 3 due to forces resulting from flow of the hydrocarbon emulsion. The filter 3 of the water-removing funnel insert 1 is positioned upon the porous surface 7 in such manner as to result in the distribution of forces exerted by the hydrocarbon emulsion upon the filter 3. By distributing the forces exerted by the hydrocarbon emulsion, excessive stresses upon any specific portion of the filter 3 are avoided. In a preferred embodiment, the porous surface 7 consists of a screen or grid which can also act as a secondary device to capture any large particles that may evade the filter 3.

The filter 3 comprises a top surface 31 and a bottom surface 33 (as shown in FIG. 3 and FIG. 6). The hydrocarbon emulsion first flows to the top surface 31 of the filter 3, such that the top surface 31 (or "upstream face") comes into contact with an upper part of the stream of the hydrocarbon emulsion. Upon being dehydrated the hydrocarbon stream exits the filter 3 via the bottom surface 33 of the filter 3, such that the bottom surface 33 (or "downstream face") comes into contact with a lower part of the hydrocarbon stream and serves as the exit from the filter 3 for the dehydrated hydrocarbon stream. At its bottom surface 33, the filter 3 is in contact with and rests against the porous surface 7 that preferably consists of a metallic or plastic screen or grid. In a preferred embodiment, the porous surface 7 and the filter 3 are circular. Depending upon the shape of the supporting body 5, the diameter of the porous surface 7 may be either slightly smaller or slightly larger than the diameter of the filter 3. (Please compare FIG. 3 with FIG. 6.)

In some comparable devices, the support of a filter is provided by a flow-through screen or grid by lashing, wiring, bolting, welding or in some other way fastening the filter to the screen or grid. An innovative characteristic of the present invention is the quick and simple removal of the filter 3 due to the lack of any attachments between the filter 3 and the porous surface 7. The water-removing funnel insert 1 may be used repeatedly by simply removing and replacing the filter 3 periodically when needed. Although filter 3 life depends on the condition of the hydrocarbon emulsion, stages for removal and replacement of the filter 3 can be very easily and quickly determined. The filter 3 absorbs, collects and encapsulates water and some contaminants until the filter 3 reaches its maximum holding capacity. The absorption, collection and encapsulation of water and contaminants by the filter 3 results in a restriction of fluid flow rate, thus indicating the need for a change or restoration of the filter 3. When the flow rate of the dehydrated hydrocarbon stream decreases, a replacement of the filter 3 is desirable. The filter 3 can be used until the maximum holding capacity of the filter 3 is reached. At any time before reaching its maximum holding capacity, the filter 3 may be removed to be either dried for reuse or disposed of. It should be noted that each time a filter 3 is dried or regenerated, the filter 3 generally loses approximately 25% of its water-absorbing efficiency. To achieve better results, the filter 3 is removed before reaching its maximum holding capacity. When the filter 3 is reaching its maximum holding capacity, the flow of dehydrated hydrocarbon stream through the filter 3 slows down to a great extent, indicating that a change of filter 3 is needed. The filter 3 must be replaced by a new filter 3 before the flow rate of the dehydrated hydrocarbon stream stops.

In a preferred embodiment, the filter 3 is oleophobic and hydrophilic. By employing a filter 3 comprising oleophobic hydrophilic material, water may be easily separated from the hydrocarbon emulsion. The filter 3, thus, has oleophobic properties (i.e. hydrocarbons do not have any affinity to such fibers even if the filter 3 is suspended in an emulsion of the hydrocarbons) so that even large fuel droplets are not prevented from flowing through and are not absorbed by the filter 3. On the other hand, the water drops in the hydrocarbon emulsion are absorbed by the filter 3, necessitating periodical removal and replacement of the filter 3. An important feature of the water-removing funnel insert 1 is that fuel additives are not removed by the filter 3 from the hydrocarbon emulsion. The oleophobic hydrophilic material used in the filter 3 removes water from hydrocarbon fuels that are mixed with water molecules. The oleophobic hydrophilic material of the filter 3 contains an inorganic super-absorbent which has the ability to remove both free and emulsified water, as well as numerous contaminants, from hydrocarbon fluids. It should be noted that the super-absorbent reacts with the water molecules, but not with the hydrocarbon molecules that accompany the water molecules, in the hydrocarbon emulsion. Therefore, dry fuel does not activate the super-absorbent. However, the filter 3 has the ability to remove contaminants consisting of dirt, rust, slime, algae and bacteria.

Recent developments of chemical-type water removing filters which utilize super-absorbers have led to the creation of filters 3 that can be used in the present invention. The filters 3 of the water-removing funnel insert 1 remove water and some contaminants from hydrocarbon fuel streams. However, none of the useful additives of the fluid are removed by the filters 3. Service life of each primary and secondary filter of engines is extended if pre-cleaned fuel is used. The filter 3 of the water-removing funnel insert 1 is composed of a varying blend of cellulose and/or synthetic material which has been impregnated with resin and composited with a super-absorbent laminate. A preferred embodiment of the filter 3 includes resin-impregnated filter paper composited with a super-absorbent laminate. Preferably, the filter paper comprises isobutylene reacted with maleic anhydride and is a cross-linked acrylate copolymer partially neutralized to the sodium salt. The filter paper may also comprise phenol, formaldehyde, vinyl acetate, methanol and isopropanol. In a preferred embodiment, the super-absorbent oleophobic hydrophilic material (such as oleophobic fibers, threads or filaments) of the filter 3 have a denier of about 30 dtex. The super-absorbent fiber, that has a denier of about 30 dtex, is typically used in air-laid processes by which applicable absorbent material is produced. However, the super-absorbent fiber can have a denier of as low as about 10 dtex when used in other processes (i.e. processes that are not air-laid) by which the absorbent material is produced. In one embodiment, the water-removing funnel insert 1 utilizes a 5-micron nominal particulate removal filter paper. (It may be of interest to note that presently automotive, marine and small engine manufacturers generally provide 10-micron nominal filters to remove any particulate contamination.)

Figure 4:
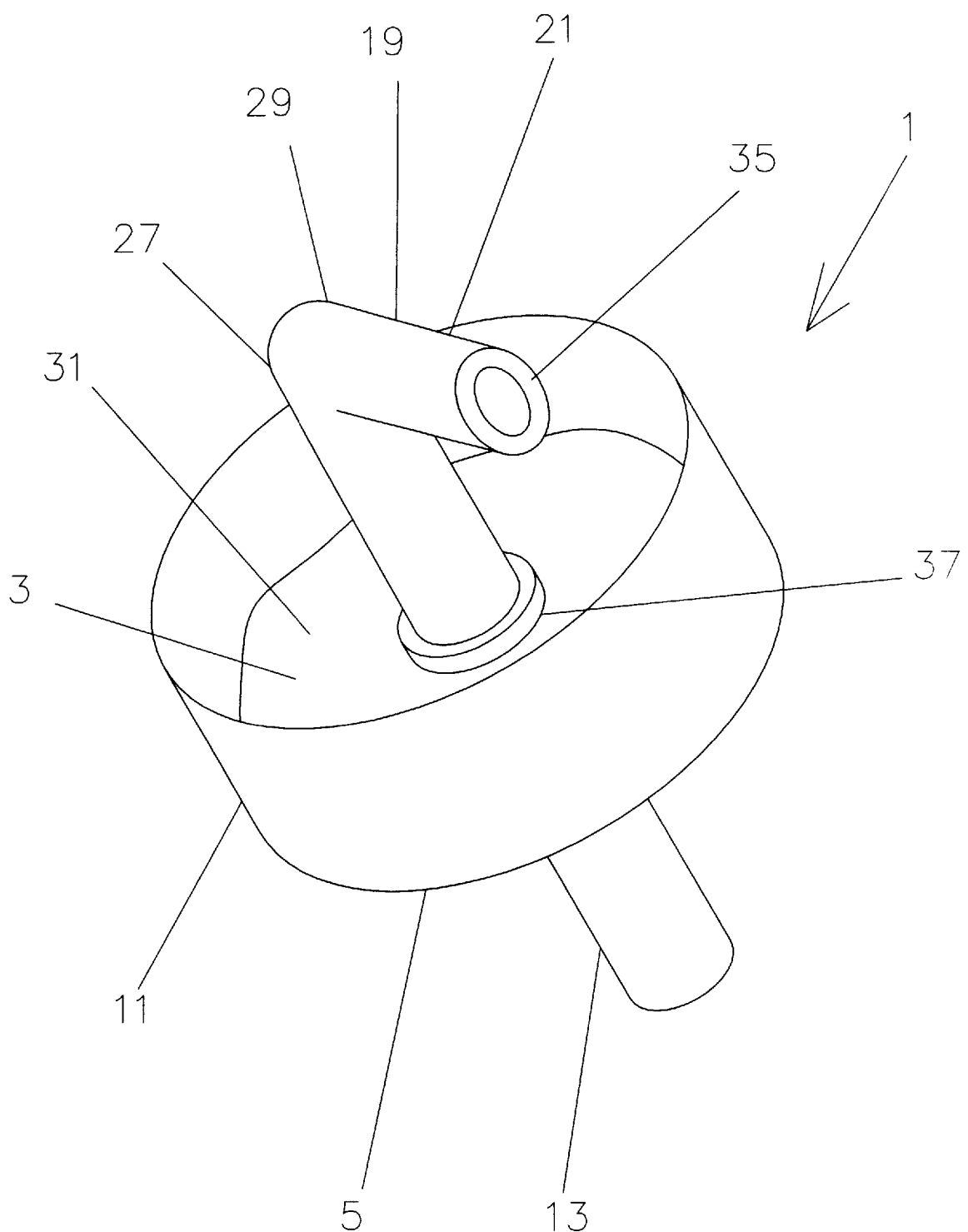
FIG. 4 shows an isometric view of a preferred embodiment of a water-removing funnel insert having a filter.
Figure 5:
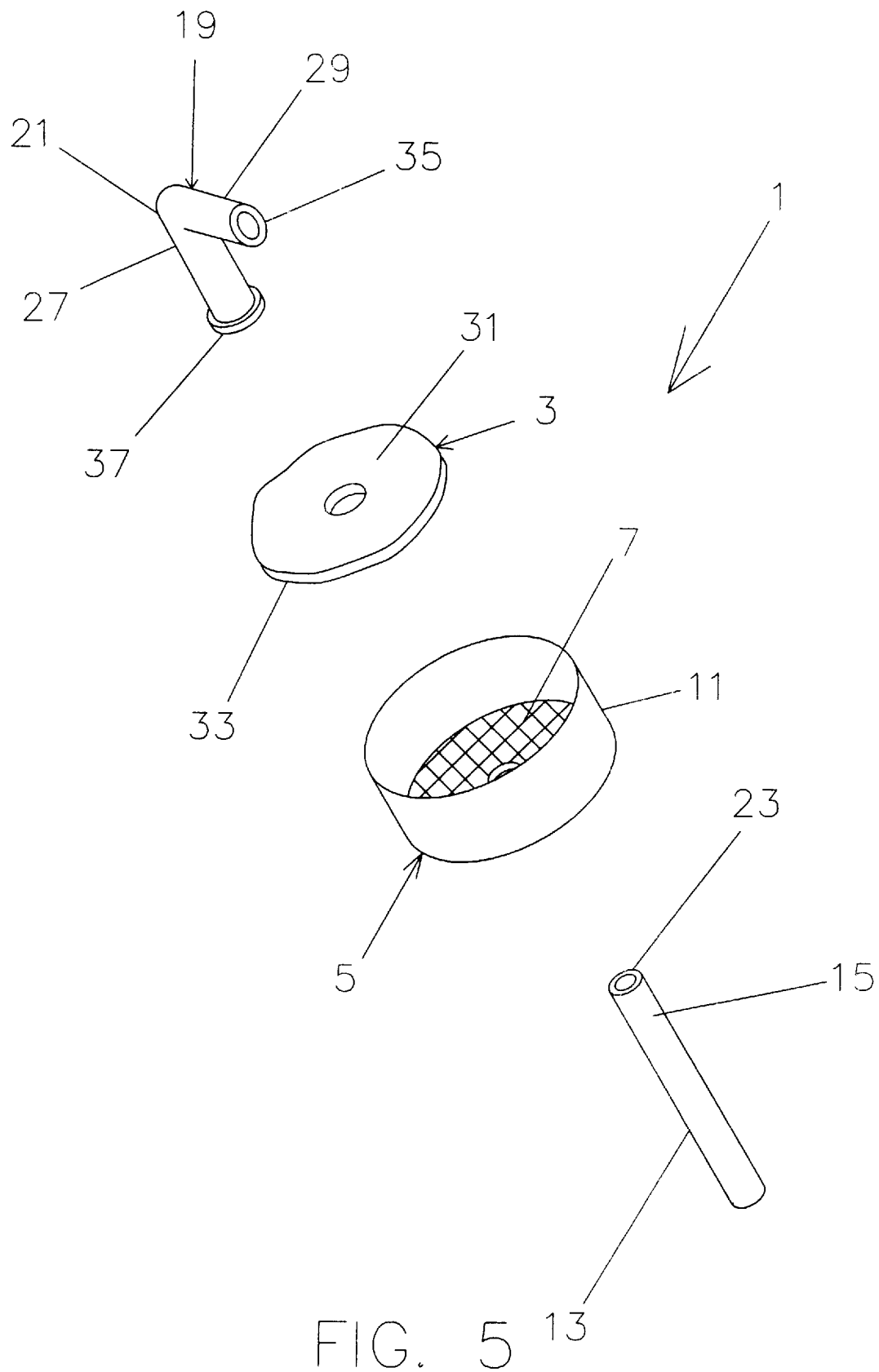
FIG. 5 shows an exploded view of FIG. 4.

In some embodiments, the supporting body 5 also has a tubular side wall 11 for which the porous surface 7 serves as a base (as shown in FIGS. 4–6). The tubular side wall 11 has an open upper end and extends upwardly from the porous surface 7. If the porous surface 7 forms the base of a tubular side wall 11 with an open upper end, the diameter of the filter 3 is preferably slightly smaller than the diameter of the porous surface 7 (refer to FIG. 4 and FIG. 6). In such case, the filter 3 fits tightly within and is surrounded by the tubular side wall 11 of the supporting body 5. In embodiments which do not include a tubular side wall 11 for encircling the porous surface 7, the diameter of the filter 3 is preferably slightly larger than the diameter of the porous surface 7 in order to prevent flow of the hydrocarbon emulsion out of the funnel 2 (referring to FIG. 1 and FIG. 3).

Figure 2:
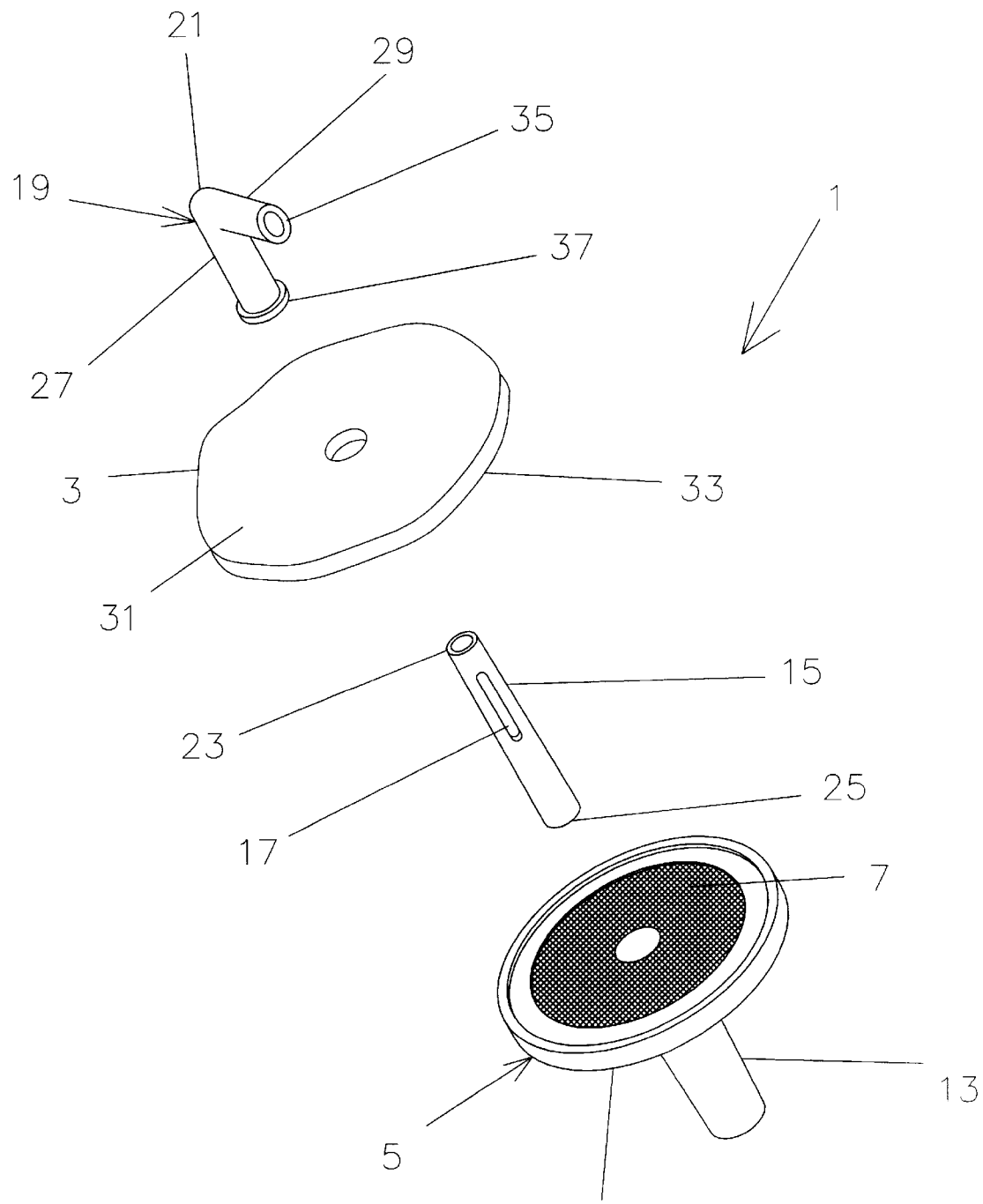
FIG. 2 shows an exploded view of FIG. 1.

The porous surface 7 may also be supported by a base 9 of the supporting body 5 (refer to FIGS. 1–3). The porous surface 7 rests over and is either connected to or not connected to the base 9. The base 9 serves to minimize any movements of the porous surface 7 and of the filter 3 during flow of the hydrocarbon emulsion. The tubular side wall 11 may be connected either to the porous surface 7 or to the base 9 of the supporting body 5.

A support tube 13 may be used for stabilization of the water-removing funnel insert 1. As shown in FIG. 2, the support tube 13 is positioned below the porous surface 7 and extends downwardly. If an open path extends through the support tube 13, the support tube 13 may also serve as a vent tube. When acting as a vent, the support tube 13 contributes to a simplification of the flow of the hydrocarbon emulsion and of the dehydrated hydrocarbon stream by minimizing suction. When in use, the support tube 13 of the water-removing funnel insert 1 is slidably retained above a stationary guide rod 10 of a surrounding base funnel 2. In addition to the guide rod 10, the base funnel 2 comprises an upper section 4 that is preferably conical and that has a top opening 6 and a bottom opening 8. The guide rod 10 is an extension of the conical upper section 4. In a preferred embodiment, the guide rod 10 and the conical upper section 4 share a central axis. The top opening 6 of the conical upper section 4 is surrounded by a top edge 12. The bottom opening 8 of the conical upper section 4 opens into the guide rod 10. The base funnel 2 supports the water-removing funnel insert 1 that is positioned and contained in the conical upper section 4. To allow insertion of the water-removing funnel insert 1 via the top opening 6 into the base funnel 2, the porous surface 7 or the base 9 (whichever is wider, i.e. has a larger diameter) of the water-removing funnel insert 1 may have any diameter that is smaller than the diameter of the top opening 6 of the base funnel 2. The flow rate of dehydrated hydrocarbon stream out of the base funnel 2 is proportional to: (i) the open area, of the water-removing funnel insert 1, wherefrom the dehydrated hydrocarbon stream leaves the water-removing funnel insert 1, and (ii) the smallest open area of numerous cross-sections of the guide rod 10. The dehydrated hydrocarbon stream exits the water-removing funnel insert 1 through pores in the porous surface 7 or, if the water-removing funnel insert 1 has a base 9, through any openings of the base 9. Thus, the rate of flow of the dehydrated hydrocarbon stream towards the guide rod 10 of the base funnel 2 is proportional to the total open area formed by the pores of the porous surface 7 or by the openings of the base 9. The position, within the base funnel 2, of the water-removing funnel insert 1 does not play a role in determining the flow rate of the dehydrated hydrocarbon stream towards the guide rod 10. The width (i.e. the size of the diameter) of the porous surface 7 or of the base 9, whichever is larger, is essential in setting up the position of the water-removing funnel insert 1 within the base funnel 2. However, it is the total open area, but not the width, of the porous surface 7 or of the base 9 that may play a role in determining the flow rate of the dehydrated hydrocarbon stream towards the guide rod 10. The flow rate of the dehydrated hydrocarbon stream out of the base funnel 2 is proportional to the flow rate of the dehydrated hydrocarbon stream towards the guide rod 10 and is proportional to the smallest open area among the open areas of the numerous cross-sections of the guide rod 10. It should be emphasized that these examples are preferred embodiments of the invention and are not in any way meant to establish limitations on the present invention. Various combinations of the base 9 and the porous surface 7 may be used.

An upwardly-extending bar 15 is another optional component of the supporting body 5 and has an upper ending 23 and a lower ending 25. The upwardly-extending bar 15 may be hollow, in which case the upwardly-extending bar 15 functions also as a vent to enhance fluid flow. If the upwardly-extending bar 15 is hollow and is an extension of the support tube 13, the support tube 13 must be hollow as well in order to form a vent for enhancing fluid flow. The upwardly-extending bar 15 of the supporting body 5 is used to facilitate handling of the water-removing funnel insert 1. When the water-removing funnel insert 1 is placed in the base funnel 2, the upper ending 23 of the upwardly-extending bar 15 is preferably within a reachable distance from the top opening 6 of the base funnel 2. To remove the water-removing funnel insert 1, a user can hold and pull up the upwardly-extending bar 15. Either the support tube 13 or the upwardly-extending bar 15 or both may be attached to the supporting body 5. If the supporting body 5 has the support tube 13 and the upwardly-extending bar 15, the upwardlyextending bar 15 may end at the supporting body 5, open directly into the support tube 13 or be an extension of the support tube 13. For the dehydrated hydrocarbon stream to flow through the upwardly-extending bar 15 directly into the support tube 13, there are openings 17 in a section of the upwardly-extending bar 15 existing below and close to the filter 3.

Preferably, the upwardly-extending bar 15 has, at its upper ending 23, a hook 19. The hook 19, that is positioned at the upper ending 23 of the upwardly-extending bar 15, serves as a means to even further stabilize the position of the water-removing funnel insert 1 within the base funnel 2. If an open path extends through the hook 19, as well as through the upwardly-extending bar 15, the open path serves as a vent and simplifies the flow of the hydrocarbon emulsion and of the dehydrated hydrocarbon stream by minimizing suction. If the upwardly-extending bar 15, that is attached to the hook 19, is an extension of the support tube 13, openings 17 are preferably available in a section of the upwardly-extending bar 15 existing below and close to the filter 3 and serve as entrances for flow of dehydrated hydrocarbon stream through the upwardly-extending bar 15 into the support tube 13 and out of the base funnel 2. Preferably, the hook 19 is removably attached to the upwardly-extending bar 15. The hook 19 is a curved tube 21 with a top end 35 and an open bottom end 37. The curved tube 21 comprises a lower portion 27, that is preferably straight and that ends at the open bottom end 37 of the hook 19, and a slanted upper portion 29 that is an extension of the straight lower portion 27 and that starts from the top end 35 of the hook 19. The hook 19 preferably consists of relatively hard plastic that is only sufficiently expandable to allow insertion of a top section of the upwardly-extending bar 15 into the straight lower portion 27 of the hook 19. The slanted upper portion 29 of the hook 19 is used to hold on to a part of the top edge 12 of the base funnel 2. In order to minimize any movements of the hook 19 about the top edge 12 when the water-removing finnel insert 1 is placed in the base funnel 2, the top edge 12 of the base funnel 2 has a thickness that is smaller than, but preferably very close to, the radial distance between the slanted upper portion 29 and the straight lower portion 27 of the hook 19. The attachment of the straight lower portion 27 of the hook 19 to the upwardly-extending bar 15 is preferably strong enough to enable the hook 19, while catching on to the top edge 12 of the base funnel 2, to hold the upwardly-extending bar 15 and all other parts of the water-removing funnel insert 1 hanging without using any other support. Upon using hooks 19 of different length, the funnel insert 1 can rest at any position in the base funnel 2 where the diameter of the porous surface 7 or of the base 9, whichever is larger, of the water-removing funnel insert 1 is smaller than the diameter of the conical upper section 4 of the funnel 2. In a preferred embodiment, the length of the straight lower portion 27 of the hook 19 is chosen to assure that, when the water-removing funnel insert 1 is placed at the desired position within the conical upper section 4 of the base funnel 2, the slanted upper portion 29 of the hook 19 holds on to and catches on to the top edge 12 of the base funnel 2. Therefore, the hook 19 strengthens the connection of the supporting body 5 with the base funnel 2 and increases the stability of the water-removing funnel insert 1. Meanwhile, the hook 19 is easily, quickly and manually removed, changed and replaced.

The method of application of the water-removing funnel insert 1 is very simple. The water-removing funnel insert 1 is released into or placed within the conical upper section 4 of the base funnel 2, such that the water-removing funnel insert 1 moves downwardly from the top opening 6 of the conical upper section 4 towards the guide rod 10. The filter 3 of the water-removing funnel insert 1 shall be always facing the top opening 6, of the conical upper section 4, wherefrom the hydrocarbon emulsion is poured. No adjustments are needed to determine or establish the position of the waterremoving finnel insert 1. The position where the water-removing funnel insert 1 rests depends upon the sizes of the water-removing funnel insert 1 and of the surrounding base funnel 2. As soon as the water-removing funnel insert 1 is released into or placed within the conical upper section 4, the water-removing funnel insert 1 automatically moves to and stably rests at a position in the conical upper section 4 where the diameter of the water-removing funnel insert 1 is so close to the diameter of the conical upper section 4 that any downward movement of the water-removing finnel insert 1 is prevented. If the water-removing funnel insert 1 has a hook 19, the hook 19 is arranged at a specific position on the upwardly-extending bar 15, such that the hook 19 holds on to a portion of the top edge 12 of the base funnel 2. When the water-removing funnel insert 1 is resting at the optimal position in the conical upper section 4 where any noticeable movement of the water-removing funnel insert 1 is prevented, the hydrocarbon emulsion is poured via the top opening 6 of the conical upper section 4 into the base funnel 2. As the hydrocarbon emulsion passes through the porous filter 3, the free and emulsified water, as well as some contaminants, are removed. The dehydrated hydrocarbon stream leaves the filter 3 via the bottom surface 33 of the filter 3 and flows from the filter 3 towards the guide rod 10. The dehydrated hydrocarbon stream passes through the guide rod 10 into the desired fuel-consuming equipment or device. Thus, numerous contaminants and the water are removed in one and the same pass when the fluid is being transferred for direct consumption.

The removal of the water-removing funnel insert 1 is simple and quick and does not require any equipment since there are no attachments between the water-removing funnel insert 1 and the base finnel 2. With the water-removing finnel insert 1 solely resting against and within the conical upper section 4 of the base funnel 2, the placement, removal, replacement and exchange of the water-removing funnel insert 1 can be handled by anyone and at any time and does not require any expertise or familiarity with emulsions or dehydration of emulsions. When desired, the water-removing funnel insert 1 is moved out of the base funnel 2. The filter 3 can be removed and replaced by another filter 3. At any time, the water-removing finnel insert 1 can be once again released into or placed within the conical upper section 4 of the base funnel 2.

The present invention provides an improved application of equipment, lower operating costs, shorter periods of time for repair services and, thus, increased profits. The water-removing funnel insert 1 removes impurities while the hydrocarbon fluid is being transferred from the fluid storage container to the equipment that consumes the fluid. Use of the water-removing funnel insert 1 assures that clean and dry hydrocarbon fluids are transferred to the fluid-consuming equipment.

Certain objects are set forth above and made apparent from the foregoing description, drawings and examples. However, since certain changes may be made in the above description, drawings and examples without departing from the scope of the invention, it is intended that all matters contained in the foregoing description, drawings and examples shall be interpreted as illustrative only of the principles of the invention and not in a limiting sense. With respect to the above description and examples then, it is to be realized that any descriptions, drawings and examples deemed readily apparent and obvious to one skilled in the art and all equivalent relationships to those stated in the examples and described in the specification or illustrated in the drawings are intended to be encompassed by the present invention.

Further, since numerous modifications and changes will readily occur to those skilled in the art, it is not desired to limit the invention to the exact construction and operation shown and described, and accordingly, all suitable modifications and equivalents may be resorted to, falling within the scope of the invention. It is also to be understood that the following claims are intended to cover all of the generic and specific features of the invention herein described, and all statements of the scope of the invention which, as a matter of language, might be said to fall in between.

What is claimed as invention is:

1. A water-removing funnel insert for separating and removing water and numerous contaminants from a hydrocarbon emulsion, said water-removing funnel insert comprising:

(a) a hydrophilic, oleophobic filter that separates the water and contaminants from the hydrocarbon emulsion;
   (b) a supporting body for securely upholding the filter and comprising a porous surface that is covered by the filter; and
   (c) a support tube that is attached to the supporting body, that is positioned below the porous surface and that extends downwardly;
      such that the water-removing funnel insert fits in any funnel having a top opening that is large enough to allow insertion of the water-removing funnel insert into the funnel and having a bottom opening that is small enough to prevent exit of the water-removing funnel insert from the bottom opening of the funnel; and
      such that no hydrocarbon emulsion exits the water-removing funnel insert without passing through the filter and without being dehydrated.

2. The water-removing funnel insert according to claim 1, wherein the supporting body has a base that supports the porous surface.

3. The water-removing tunnel insert according to claim 1, wherein the supporting body is attached to an upwardly-extending bar.

4. A water-removing funnel insert 3, for separating and removing water and numerous contaminants from a hydrocarbon emulsion, said water-removing funnel insert comprising:

(a) a hydrophilic, oleophobic filter that separates the water and contaminants from the hydrocarbon emulsion;
   (b) a supporting body for securely upholding the filter and comprising a porous surface that is covered by the filter;
   (c) a support tube that is attached to the supporting body, that is positioned below the porous surface and that extends downwardly; and
   (d) an upwardly-extending bar that is attached to the supporting body;
      such that the water-removing funnel insert fits in any funnel having a top opening that is large enough to allow insertion of the water-removing funnel insert into the funnel and having a bottom opening that is small enough to prevent exit of the water-removing funnel insert from the bottom opening of the funnel; and
      such that no hydrocarbon emulsion exits the water-removing funnel insert without passing through the filter and without being dehydrated.

5. The water-removing funnel insert according to claim 4, wherein the upwardly-extending bar ends at the supporting body.

6. The water-removing funnel insert according to claim 4, wherein the upwardly-extending bar opens directly into the support tube.

7. The water-removing funnel insert according to claim 6, wherein openings exist in the upwardly-extending bar below the porous surface of the supporting body, such that dehydrated hydrocarbon stream flows through the openings into the upwardly-extending bar and, therefrom, into the support tube.

8. The water-removing funnel insert according to claim 4, wherein the support tube is an extension of the upwardly-extending bar.

9. The water-removing funnel insert according to claim 8, wherein openings exist in the upwardly-extending bar below the porous surface of the supporting body, such that dehydrated hydrocarbon stream flows through the openings into the upwardly-extending bar and, therefrom, into the support tube.

10. The water-removing funnel insert according to claim 1, wherein the supporting body has a tubular side wall extending upwardly from and surrounding the porous surface.

11. The water-removing funnel insert according to claim 1, wherein the porous surface consists of a screen or a grid which also serves as a secondary device to capture any relatively large particles that may evade the filter.

12. The water-removing funnel insert according to claim 1, wherein the filter contains an inorganic super-absorbent.

13. The water-removing funnel insert according to claim 12, wherein the super-absorbent has a denier of at least about 10 dtex.

14. The water-removing funnel insert according to claim 1, wherein the contaminants consist of dirt, rust, slime, algae and bacteria.

15. A water-removing funnel insert for separating and removing water and numerous contaminants from a hydrocarbon emulsion, said water-removing funnel insert comprising:
   (a) a hydrophilic, oleophobic filter that separates the water and contaminants from the hydrocarbon emulsion;
   (b) a supporting body for securely upholding the filter and comprising a porous surface that is covered by the filter;
   (c) a support tube that is attached to the supporting body, that is positioned below the porous surface and that extends downwardly;
   (d) an upwardly-extending bar that is attached to the supporting body; and
   (e) a hook that is attached to an upper ending of the upwardly-extending bar and that is used for holding onto the funnel and for hanging the water-removing funnel insert from the funnel;
      such that the water-removing funnel insert fits in any funnel having a top opening that is large enough to allow insertion of the water-removing funnel insert into the funnel and having a bottom opening that is small enough to prevent exit of the water-removing funnel insert from the bottom opening of the funnel; and
      such that no hydrocarbon emulsion exits the water-removing funnel insert without passing through the filter and without being dehydrated.

16. A water-removing funnel insert for separating and removing water and numerous contaminants from a hydrocarbon emulsion, said water-removing funnel insert comprising:
   (a) a hydrophilic, oleophobic filter that contains an inorganic super-absorbent, that includes resin-impregnated filter paper composited with a superabsorbent laminate and that separates the water and contaminants from the hydrocarbon emulsion; and
   (b) a supporting body for securely upholding the filter and comprising a porous surface that is covered by the filter;
      such that the water-removing funnel insert fits in any funnel having a top opening that is large enough to allow insertion of the water-removing funnel insert into the funnel and having a bottom opening that is small enough to prevent exit of the water-removing funnel insert from the bottom opening of the funnel; and
      such that no hydrocarbon emulsion exits the water-removing funnel insert without passing through the filter and without being dehydrated.

17. The water-removing funnel insert according to claim 16, wherein the filter paper comprises isobutylene reacted with maleic anhydride and being a cross-linked acrylate copolymer partially neutralized to the sodium salt.

18. A method of operating a water-removing funnel insert, that comprises a filter and a supporting body having a porous surface that is covered by the filter, for separating and removing water and numerous contaminants from a hydrocarbon emulsion, said method comprising:
   (a) releasing the water-removing finnel insert within a finnel that has a guide rod and a conical upper section extending from the guide rod, such that the water-removing finnel insert stably rests in the conical upper section;
   (b) pouring the hydrocarbon emulsion into the conical upper section of the funnel, with the hydrocarbon emulsion being dehydrated and decontaminated while passing through the filter and with the dehydrated hydrocarbon stream leaving the water-removing funnel insert towards the guide rod and out of the finnel; and
   (c) when, due to collection and encapsulation of the water and contaminants within the filter, fluid flow rate is being restricted by the filter and before maximum holding capacity of the filter is reached, removing the filter and either reusing the filter upon drying the filter or disposing of and replacing the filter at any desired time.

* * * * *